June 12, 1923.
J. SUTHERLAND
AUTOMATIC CAR CONTROL MECHANISM
Filed Sept. 2, 1919    8 Sheets-Sheet 3
1,458,158
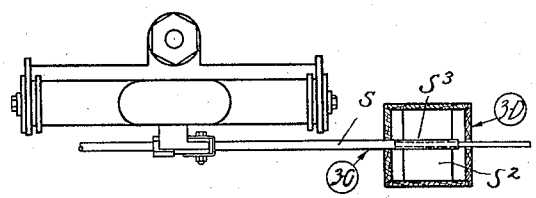
FIG. 3.
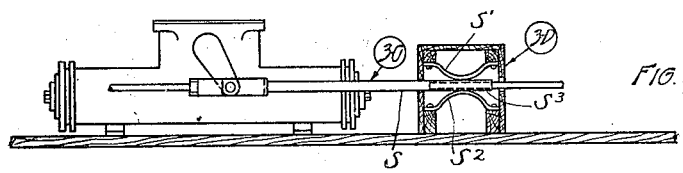
FIG. 3-A.
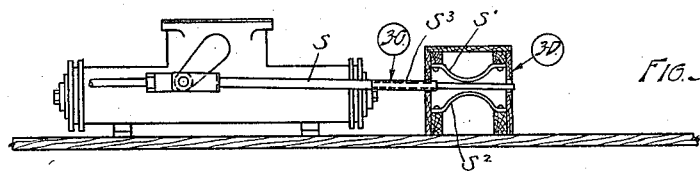
FIG. 3-B.
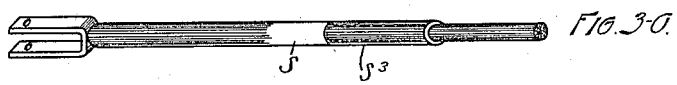
FIG. 3-C.
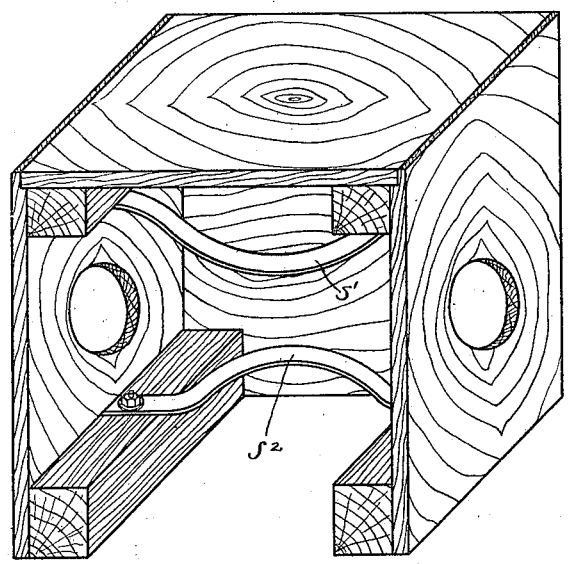
FIG. 3-D.
John Sutherland
INVENTOR
BY Parker & Carter
ATTORNEYS June 12, 1923.

J. SUTHERLAND 1,458,158

AUTOMATIC CAR CONTROL MECHANISM

Filed Sept. 2, 1919 8 Sheets-Sheet 6

INVENTOR

ATTORNEYS

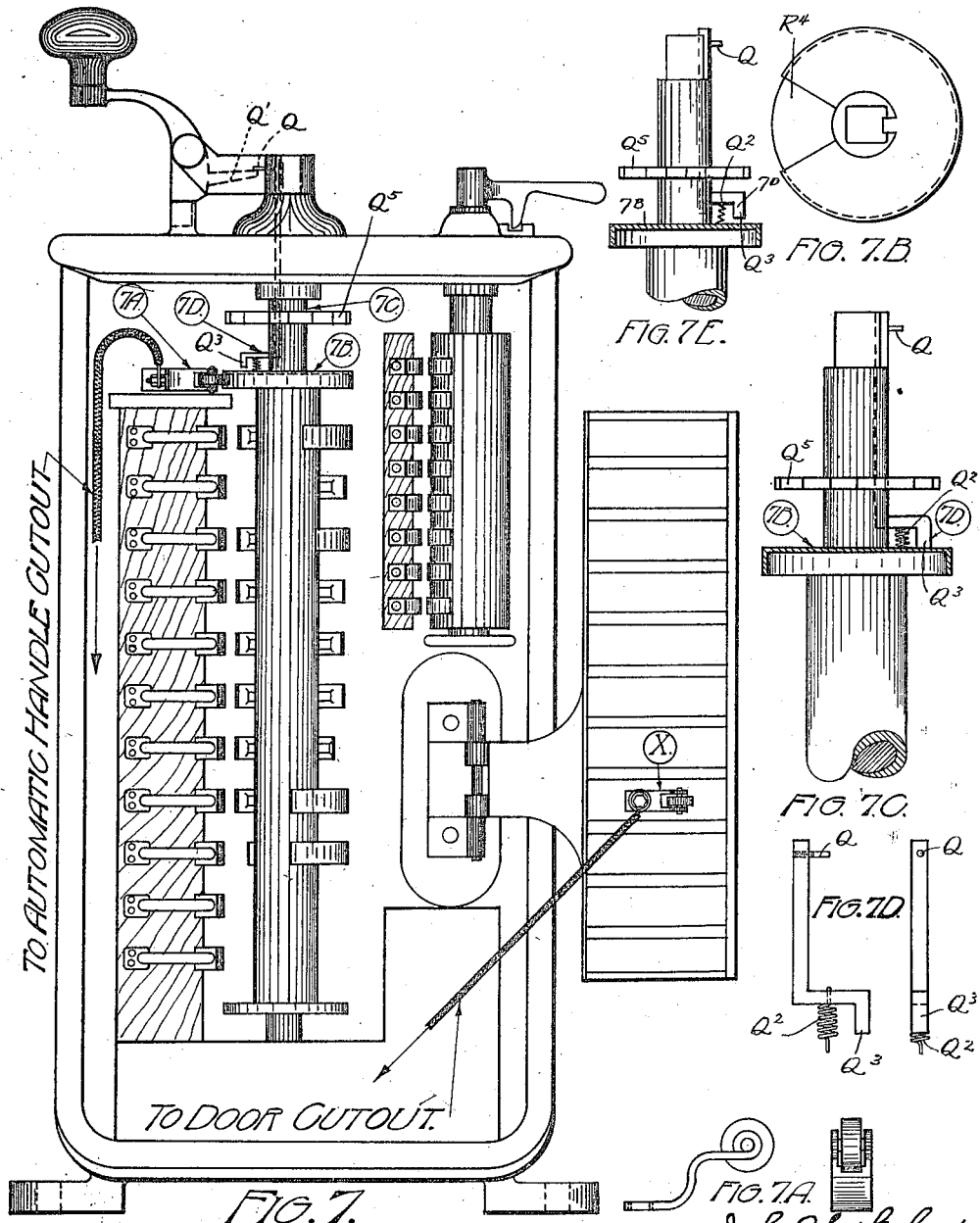

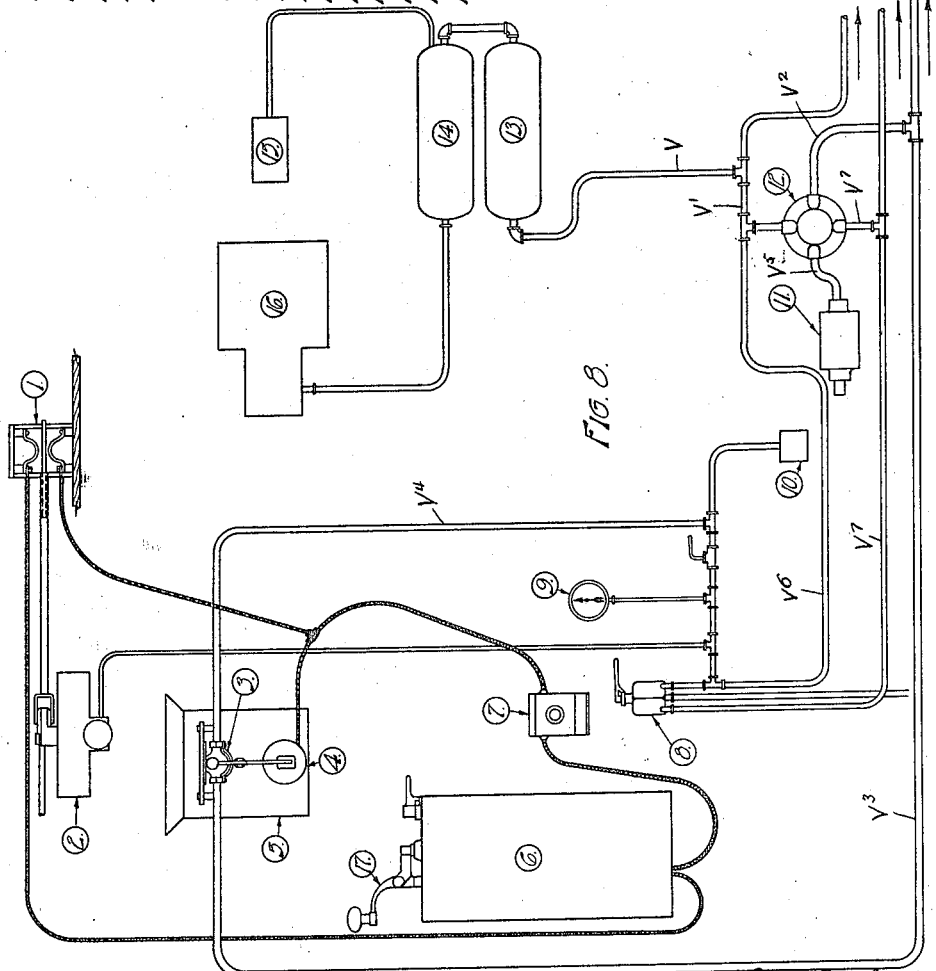

Patented June 12, 1923.

1,458,158

UNITED STATES PATENT OFFICE.

JOHN SUTHERLAND, OF DAVENPORT, IOWA.

AUTOMATIC CAR-CONTROL MECHANISM.

Application filed September 2, 1919. Serial No. 321,037.

*To all whom it may concern:*

Be it known that I, JOHN SUTHERLAND, a citizen of Great Britain, residing at Davenport, in the county of Scott and State of Iowa, have invented a certain new and useful Improvement in Automatic Car-Control Mechanism, of which the following is a specification.

My invention relates to an electric pneumatic safety control for the operation of electric street cars; and the objects of my invention are, first, to provide a positive and safe automatic stopping arrangement, so that, should the operator of the car become faint, be stricken, or for any other reason become incapacitated, the car will come to a stop by the automatic operation of my device; second, in case of an impending collision, actual collision, danger of running into pedestrians, the car can be brought to a stop by operator releasing controller handle. Another object is to provide means for making it impossible to start the car when the car doors are open. Other objects will appear from time to time in the specification.

My invention is illustrated more or less diagrammatically in the accompanying drawings wherein—

Figure 1 is a side elevation in part section of the controller handle;

Figure 1$^a$ is a plan view of the handle shown in Figure 1;

Figure 1$^b$ is a detail of the handle knob;

Figure 1$^c$ is a detail of the pin which secures the knob to the handle.

Figure 1$^d$ shows the pivot pin joining the two parts of the controller handle together;

Figure 1$^e$ shows the spring located within the controller handle and adapted, when the hand of the operator is removed therefrom, to raise the handle up in a counter clockwise direction as shown in Figure 1;

Figure 1$^f$ shows the controller spindle section of the handle in plan view;

Figure 1$^g$ is a side elevation of Figure 1$^f$;

Figure 1$^h$ is a plan view of the pivoted part of the controller handle;

Figure 1$^i$ is an elevation of Figure 1$^h$.

Figure 2 is a section through a foot control switch for breaking the circuit between the controller handle and circuit breaker;

Figure 2$^a$ is a part section, part plan view of the device shown in Figure 2;

Figure 2$^b$ shows the insulated spring base in plan and section;

Figure 2$^c$ shows the spring in plan and elevation, which presses the contact disc back against the contact points to complete the circuit between the controller and circuit breaker;

Figure 2$^d$ shows the contact disc in elevation and section;

Figure 2$^e$ shows the contact springs in elevation and plan;

Figure 2$^f$ shows the combination wire binding post and contact block;

Figure 2$^g$ shows the wood insulator block for mounting the part 2$^f$;

Figure 2$^h$ shows the insulated foot push button which, upon pressure, breaks the circuit between the controller and the circuit breaker;

Figure 3 shows a plan view of a door operating engine with cut out attached in door open position;

Figure 3$^a$ shows a side elevation of same in door open position;

Figure 3$^b$ the same in door closed position;

Figure 3$^c$ shows the contact box with the side sliding rod associated with the door operating engine for making and breaking the circuit as the doors open and close.

Figure 3$^d$ shows the contact box with the side contacts in place.

Figure 6:
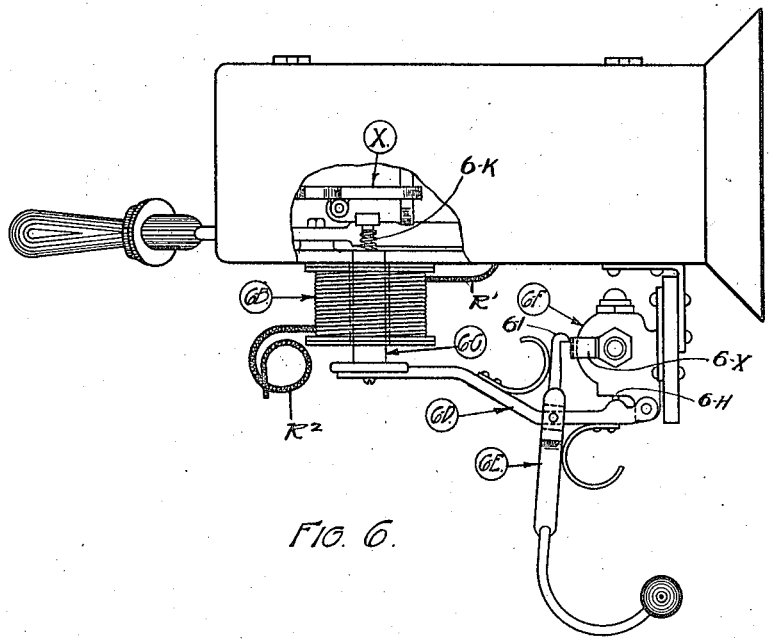
Figure 6 is a side elevation in part section of a circuit breaker showing my control attached.
Figure 6A:
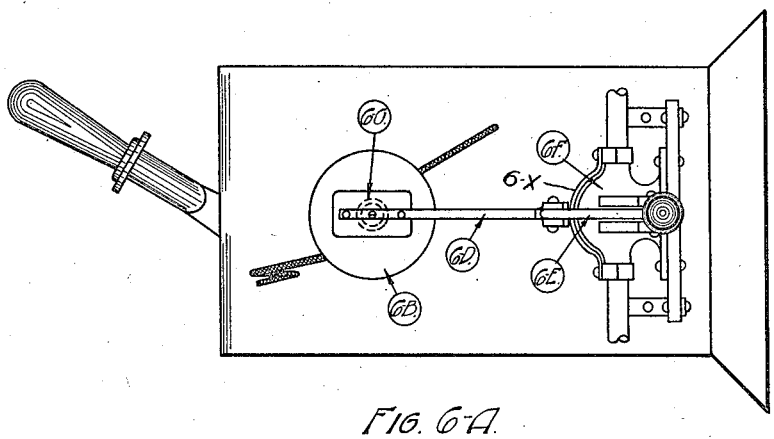

Figure 6$^a$ is a plan view of same;

Figure 7 is an elevation of a normal electric car controller;

Figure 7$^a$ shows a roller contact for the revolving disc on top of the controller;

Figure 7$^b$ shows the copper disc for contact with Fig. 7$^a$;

Figure 7$^c$ is a detail of the upper end of the controller shaft and associated parts;

Figure 7$^d$ shows two views of the contact member associated with the controller shaft and adapted to engage the disc 7$^b$;

Fig. 7$^e$ is a view similar to view 7$^c$ illustrating the contact 7$^d$ when withdrawn.

Figure 8 is a diagrammatic showing of the automatic car control mechanism.

Like parts are indicated by like characters in all the figures.

From the drawings, the operation of the controller handle itself will be obvious. When the hand of the operator is removed from the insulated wood knob 1$^b$ the spring 1$^e$ pushing down on the finger projecting inwardly from the part 1$^i$ causes the handle 1$^b$ to raise up the finger to go down. This permits the part 7$^d$ with its pin Q, which engages the finger Q$^1$ to drop down under the tension of the spring Q$^2$ so that the contact member Q$^3$ will engage the disc 7$^d$ to close the circuit. If the hand of the operator, however, is on the knob 1$^b$, the spring 1$^e$ will be compressed and the contact Q$^3$ on the member 7$^d$ will be drawn out of contact with the disc 7$^b$, thus breaking the circuit. Thus the automatic control circuit, which I shall later describe, is broken at the controller when the operator has his hand on the controller handle. Q$^5$ is any suitable member adapted to contact the element Q$^3$ and complete the electric working circuit, the wiring of which is not indicated in detail.

Figure 2:
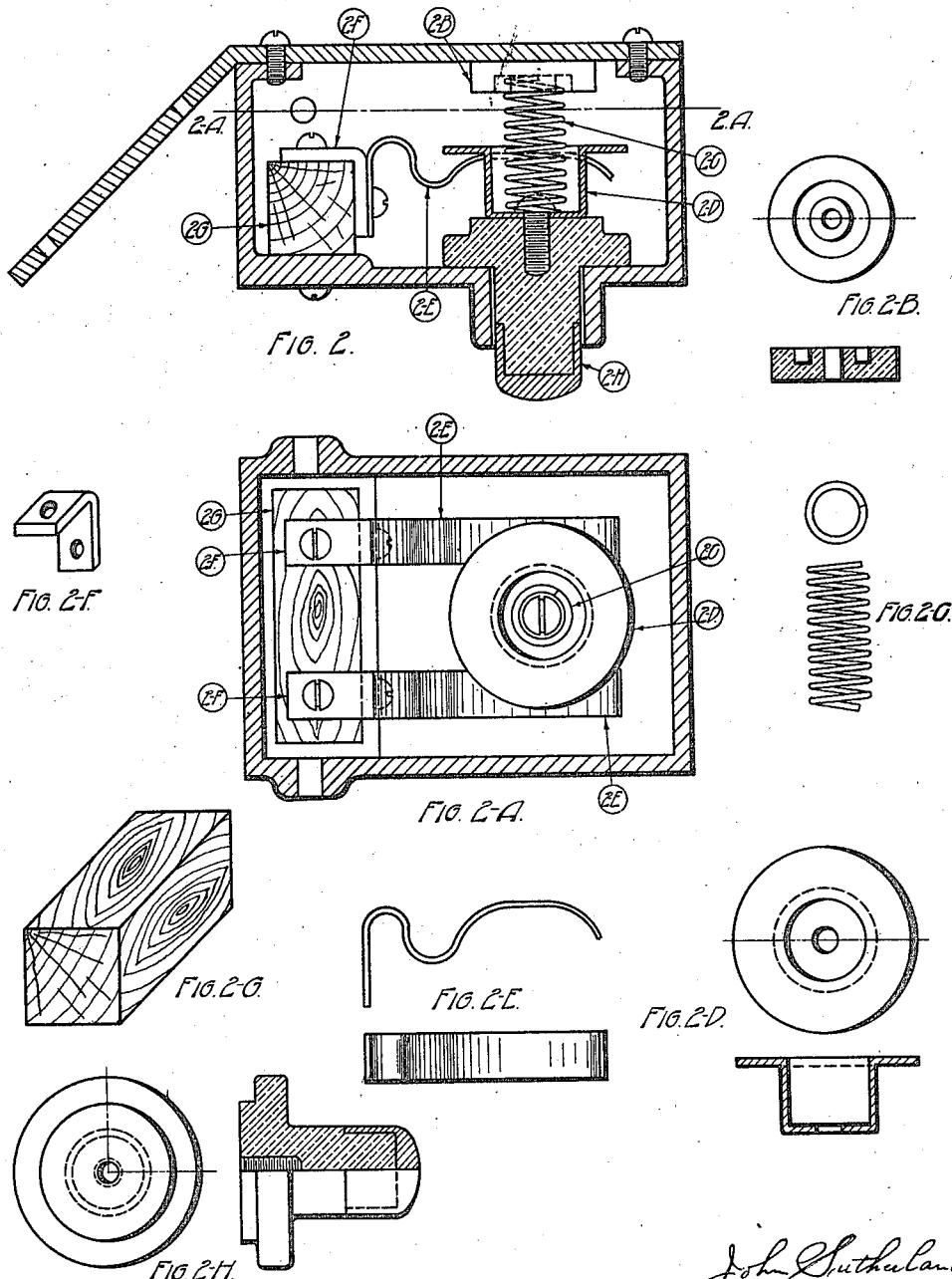

This switch control circuit may also be broken by the foot of the operator, the apparatus used for that purpose being shown in Figure 2, where the pressure of the operator's foot on the push button 2$^b$ will compress the spring 2$^c$ and move the contact member 2$^d$ out of engagement with the spring fingers 2$^e$ to break the circuit.

Figure 1:
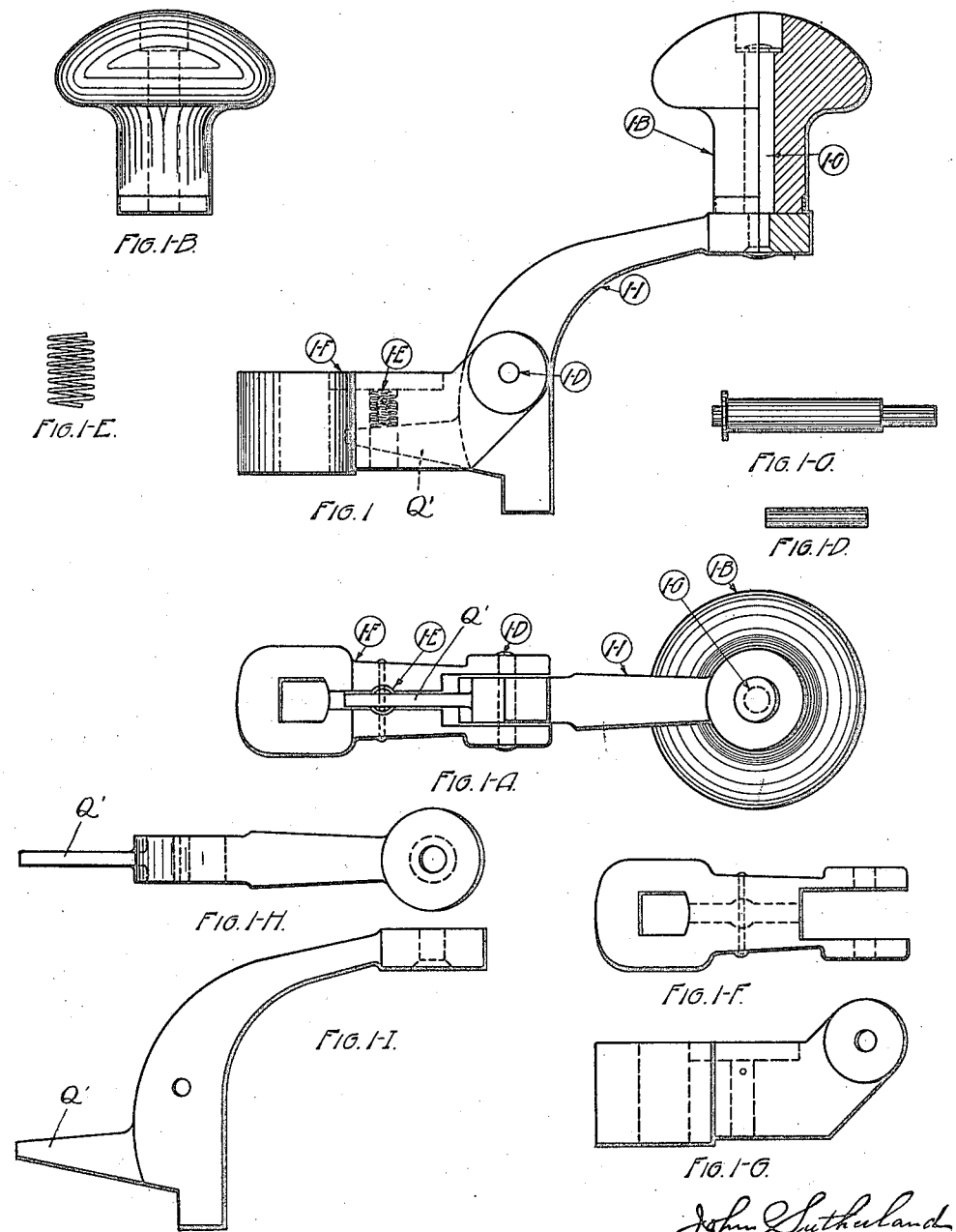
Figure 5:
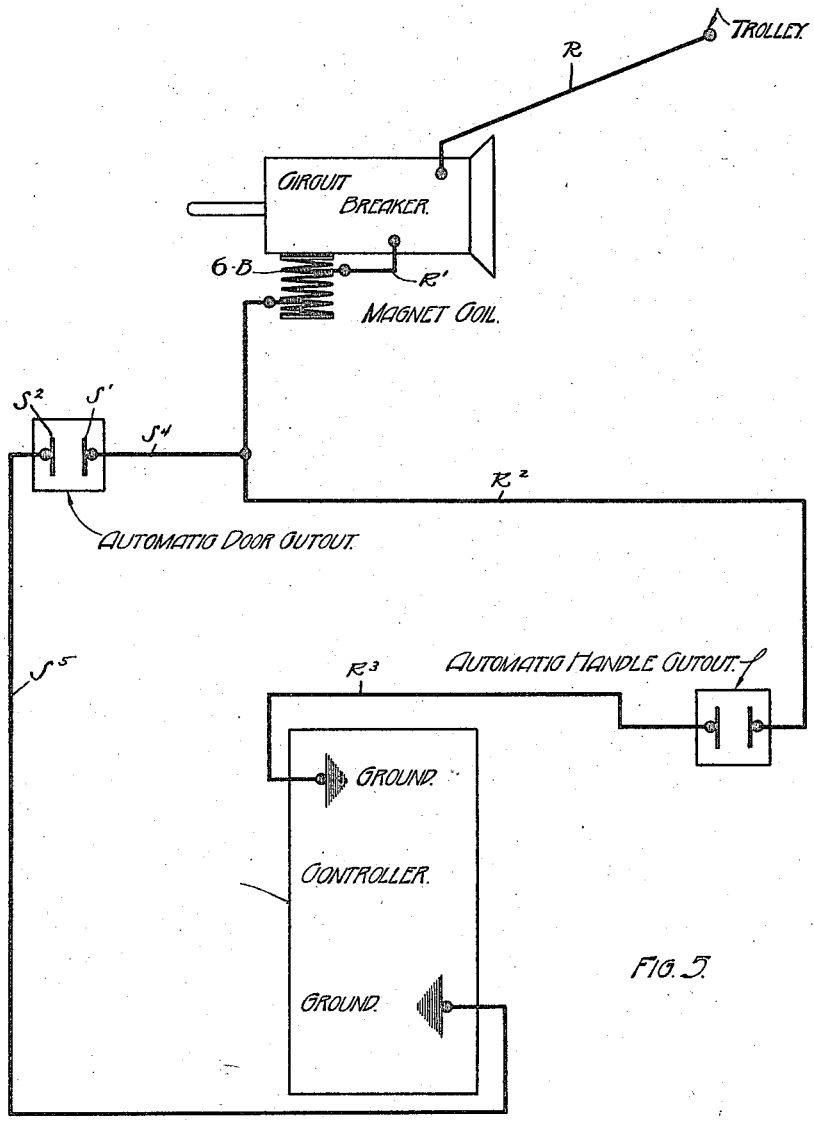
Figure 5 is a wiring diagram.

Referring to Figure 5, R is a conductor leading from the trolley pole to the circuit breaker in the usual manner. R$^1$ is a conductor leading from the circuit breaker to the magnetic coil. R$^2$ leads from the magnetic coil to the automatic handle cut out which is the same as that illustrated in Figures 1 and 7. In this same circuit is also located the foot cut out illustrated in Figure 2. Diagrammatically it is identical, of course, with the automatic handle cut out as shown in Figure 5, because the two are associated in the same circuit. R$^3$ is a conductor leading from the automatic handle cut out to the ground in the controller, so that whenever the automatic handle cut out and the automatic foot cut out switch are both closed, a circuit will be closed from the trolley pole through the magnetic coil to the ground in the controller. If the controller is in neutral position, however, the cut out portion R$^4$ in the copper disc 7$^b$ will still break the circuit and no current can pass through the magnet coil, but whenever the controller has been moved to the operating position any release of the controller handle, unless at the same time the foot button is operated, results in a current passing through the magnetic coil.

Referring now to Figures 3 and 5, the sliding rod 3$^c$ is provided with an insulating pin S adapted to separate the two spring members S$^1$, S$^2$. Adjacent this insulating pin S is a conducting collar S$^3$, the arrangement of the parts being such that when in the position shown in Figure 3$^a$ with the door open, the circuit is closed between the members S$^1$, S$^2$. When the car door is closed the members S$^1$, S$^2$ are insulated one from the other. S$^4$ is a conductor leading from the conductor R$^2$ to the member S$^1$ and S$^5$ is a conductor leading from the member S$^2$ to the controller at such a point (see Fig. 7) that the circuit is open when the controller is in off position, but such that as soon as the controller is moved to running position, the circuit is closed, the idea being that the automatic door controlled cut out circuit is closed when the door is open, but no curent passes through the magnetic coil unless the controller is turned to the starting position. However, when the controller comes to the starting position, if the door is still open and the circuit is closed, through the automatic door cut out, a current will pass through the magnetic coil.

Referring now to the part shown in Figure 6, 6$^b$ is the magnetic coil, 6$^c$ is the magnetic core associated with the lever 6$^d$ which, when rotated in a clockwise direction by the pull of the magnet, will engage the valve stem 6$^h$ to open the air valve 6$^f$. 6$^e$ is the tripping handle provided with a latch 6$^i$ which, when the lever 6$^d$ is raised, will be forced by the C springs as shown into engagement with the stop 6 to lock the valve into the open operating position. 6$^k$ is a plunger mounted on the magnetic core 6$^c$ and adapted, when the coil is energized, to throw the circuit breaker and thus break the electric circuit. It will be understood that this coil 6$^b$ is the coil which is energized in the manner suggested in connection with the description of the parts shown in Figure 5, so that when the current is turned on to start the car with the door open, or so that when the operator lets go of the operating handle while the car is going without protecting himself by putting his foot on the foot button, the coil is energized, the core is moved, the current is shut off by the circuit breaker and the air valve is opened.

It will be evident, then, that there are two parallel circuits adapted to throw the circuit breaker to interrupt the working circuit, one of them operates when the car door is open, to throw the circuit breaker, the other operates when the motorman takes his hand off the controller handle, unless he previously has placed his foot on the foot button, but it must be noted that neither one of these two circuits operate the circuit breaker unless the controller has been moved away from the neutral position. In other words, when the car is at a standstill, if the controller is at neutral or dead position, the door may be open or the hand of the operator can be taken off of the controller handle without operating the automatic stop mechanism.

Figure 4:
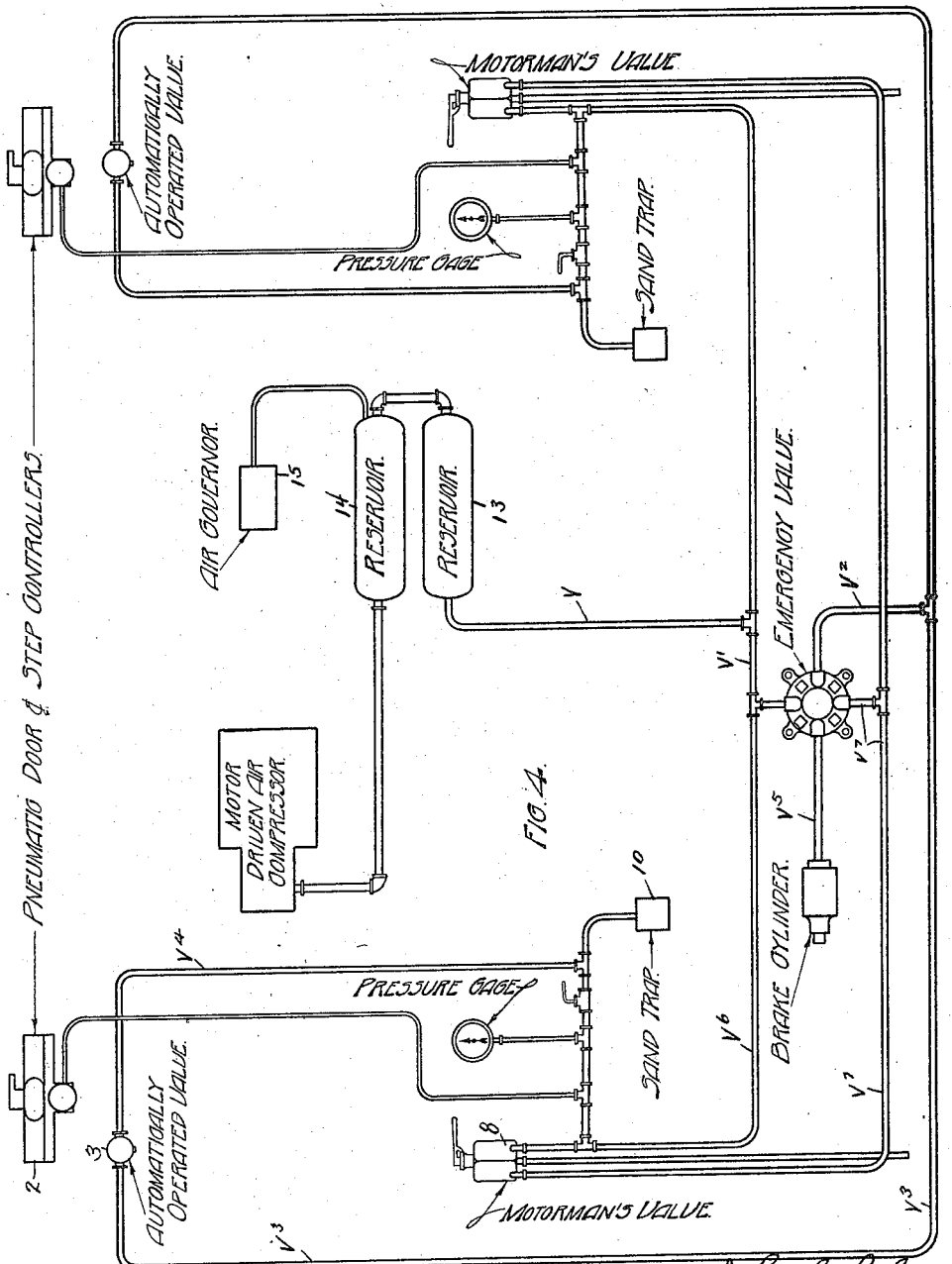
Figure 4 is a piping diagram.

Referring now to Figures 4 and 8, Figure 4 shows a general piping diagram, the parts being indicated so that they largely explain themselves. Figure 8 shows the detail of one end of the car piping system as shown in Figure 4 plus the electrical connections. When the automatically operated valve 3 is opened, air passes from the main reservoir 13 through the pipes V, V¹ to the emergency valve 12, thence through the pipes V², V³ to the automatically operated valve 3, thence through a pipe V⁴ to the sand trap 10. This flow of air operates the emergency valve and causes it to open to operate the air brake through the pipe V⁵ and air brake cylinder 11. Normally, of course, without opening the automatically operated valve 3, the operator will control the brakes by means of the motorman's valve 8 and under these conditions the air passes from the pipe V¹ through the pipe V⁶ to the motorman's valve 8, thence through the pipe V⁷ to the emergency valve and thence through the pipe V⁵ to the air brake cylinder and the sand is controlled by the sand valve 10 which is operated synchronously with the operation of the air brake cylinder 11.

The arrangement of the piping with the connections attached thereto is evident but it must be borne in mind that many changes might be made in the arrangement of parts that for instance, the automatic control might be applied to the electric working circuit only or to the air brake circuit only instead of being applied to both, or that the sand control might be omitted or that many other changes and arrangements in cooperation of the parts might be possible without departing in any way from the spirit of my invention and I wish, therefore, that my drawings be regarded as in a real sense diagrammatic.

The use and operation of my invention are as follows:

The operator stands at either end of the car or locomotive as the case may be with his hand on the controller handle. The weight of his hand keeps the handle down and thus keeps the lifting lever carried by the pivoted handle in the raised position and this in turn breaks the automatic circuit and allows the automatic cut-off to remain closed thus permitting normal operation of the car or vehicle. If the operator now takes his hand off the controller lever, immediately the circuit is closed, the solenoid is excited, the circuit breaker is operated, thus at once throwing the power off. At the same time the safety or emergency valve is operated by the release of the cut off to operate the brakes.

If the operator's hand gets tired and he wants to take it off or for some other reason he wants to take it off the controller lever, he can do so without stopping the car by putting his foot on the foot control which is in series with the controller and which breaks the circuit at a different place. The idea is, however, that if he faints or gets sick or something else happens to him and as a result he unconsciously or accidentally looses his grasp on the controller handle, he would not at the same time touch the foot button and so in the event of anything happening to the operator the car will be immediately stopped.

A pneumatic engine or motor is shown for opening or closing the car door and this is controlled in the ordinary way by the operator. This has associated with it a switch as shown which when the door is open, is closed and which when the door is closed is open so that if the operator tries to start the car when the door is open, he cannot do it as the current will only then operate the automatic cut-off and put the brake on. If, however, the door is shut, this switch is open and the operator can control the car in the usual manner.

The so-called emergency valve is of a type well-known in the art, which, when operated by the air pressure, will apply the brake. My arrangement provides an automatically operated valve which, when open, causes the operation of the emergency valve to set the brake. The means which opens this automatically operated valve at the same time electro mechanically throws the circuit breaker, to cut off the working circuit. If the operator tries to start the car while the door is open or opens the door while the car is running or takes his hand off the controller lever without putting his foot on the foot button while the controller is in the running position, the control circuit is closed, the solenoid or electro magnet is operated, the working circuit is broken and the air brakes are applied, and at the same time the air current that applies the air brakes also operates to throw sand on the track.

I claim:—

1. An automatic car stopping means for electric cars and the like comprising a working circuit, a controller, a circuit breaker, and electrically operated means for operating the circuit breaker to break the working circuit when the operator removes his hand from the controller handle when the controller is in running position, and auxiliary means controlled by the operator for neutralizing the circuit breaker operating means.

2. An automatic car stopping means for electric cars and the like comprising a working circuit, a controller, a circuit breaker, and electrically operated means for operating the circuit breaker to break the working circuit when the operator removes his hand from the controller handle when the controller is in running position, and auxiliary means controlled by the operator for neutralizing the circuit breaker operating means, said means comprising a foot switch pressure on which interrupts the circuit breaker operating means.

3. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle.

4. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, and auxiliary means controlled by the operator for neutralizing the circuit breaker operating means.

5. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, and auxiliary means controlled by the operator for neutralizing the circuit breaker operating means, said means comprising a foot switch, pressure on which interrupts the circuit breaker operating means.

6. An automatic car stopping means for electric cars and the like comprising a working circuit, a controller, a circuit breaker, and electrically operated means for operating the circuit breaker to break the working circuit when the controller is in running position and the car door is open.

7. An automatic car stopping means for electric cars and the like comprising a working circuit, a controller, a circuit breaker, and electrically operated means, operative only when the controller has been moved away from the neutral position, for operating the circuit breaker to break the working circuit, when the car door is open.

8. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position.

9. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, and auxiliary means controlled by the operator for neutralizing the circuit breaker operating means.

10. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, and auxiliary means controlled by the operator for neutralizing the circuit breaker operating means, said means comprising a foot switch, pressure on which interrupts the circuit breaker operating means.

11. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle.

12. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, and auxiliary means controlled by the operator for neutralizing the circuit breaker operating means.

13. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, and auxiliary means controlled by the operator for neutralizing the circuit breaker operating means, said means comprising a foot switch, pressure on which interrupts the circuit breaker operating means.

14. An automatic car stopping means for electric cars and the like comprising a working circuit, a controller, a circuit breaker, and electrically operated means comprising a controlling circuit and a switch adapted when closed to operate the circuit breaker to break the working circuit when the controller is in running position and the car door is open.

15. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit, when the car door is open.

16. An automatic car stopping means for electric cars and the like comprising a working circuit, a controller, a circuit breaker, and electrically operated means for operating the circuit breaker to break the working circuit when the operator removes his hand from the controller handle when the controller is in running position, and automatic means for controlling an air brake operated by the circuit breaker, and operating means for putting it into operation when the working circuit is broken.

17. An automatic car stopping means for electric cars and the like comprising a working circuit, a controller, a circuit breaker, and electrically operated means for operating the circuit breaker to break the working circuit when the operator removes his hand from the controller handle when the controller is in running position, and auxiliary means controlled by the operator for neutralizing the circuit breaker operating means, and automatic means for controlling an air brake operated by the circuit breaker, and operating means for putting it into operation when the working circuit is broken.

18. An automatic car stopping means for electric cars and the like comprising a working circuit, a controller, a circuit breaker, and electrically operated means for operating the circuit breaker to break the working circuit when the operator removes his hand from the controller handle when the controller is in running position, and auxiliary means controlled by the operator for neutralizing the circuit breaker operating means, said means comprising a foot switch, pressure on which interrupts the circuit breaker operating means, and automatic means for controlling an air brake operated by the circuit breaker, and operating means for putting it into operation when the working circuit is broken.

19. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, and automatic means for controlling an air brake operated by the circuit breaker, and operating means for putting it into operation when the working circuit is broken.

20. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, and auxiliary means controlled by the operator for neutralizing the circuit breaker operating means, and automatic means for controlling an air brake operated by the circuit breaker, and operating means for putting it into operation when the working circuit is broken.

21. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, and auxiliary means controlled by the operator for neutralizing the circuit breaker operating means, said means comprising a foot switch, pressure on which interrupts the circuit breaker operating means, and automatic means for controlling an air brake operated by the circuit breaker, and operating means for putting it into operation when the working circuit is broken.

22. An automatic car stopping means for electric cars and the like comprising a working circuit, a controller, a circuit breaker, and electrically operated means for operating the circuit breaker to break the working circuit when the controller is in running position and the car door is open, and automatic means for controlling an air brake operated by the circuit breaker, and operating means for putting it into operation when the working circuit is broken.

23. An automatic car stopping means for electric cars and the like comprising a working circuit, a controller, a circuit breaker, and electrically operated means, operative only when the controller has been moved away from the neutral position, for operating the circuit breaker to break the working circuit, when the car door is open, and automatic means for controlling an air brake operated by the circuit breaker, and operating means for putting it into operation when the working circuit is broken.

24. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, and automatic means for controlling an air brake operated by the circuit breaker, and operating means for putting it into operation when the working circuit is broken.

25. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, and auxiliary means controlled by the operator for neutralizing the circuit breaker operating means, and automatic means for controlling an air brake operated by the circuit breaker, and operating means for putting it into operation when the working circuit is broken.

26. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, and auxiliary means controlled by the operator for neutralizing the circuit breaker operating means, said means comprising a foot switch, pressure on which interrupts the circuit breaker operating means, and automatic means for controlling an air brake operated by the circuit breaker, and operating means for putting it into operation when the working circuit is broken.

27. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, and automatic means for controlling an air brake operated by the circuit breaker, and operating means for putting it into operation when the working circuit is broken.

28. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, and auxiliary means controlled by the operator for neutralizing the circuit breaker operating means, and automatic means for controlling an air brake operated by the circuit breaker, and operating means for putting it into operation when the working circuit is broken.

29. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, and auxiliary means controlled by the operator for neutralizing the circuit breaker operating means, said means comprising a foot switch, pressure on which interrupts the circuit breaker operating means, and automatic means for controlling an air brake operated by the circuit breaker, and operating means for putting it into operation when the working circuit is broken.

30. An automatic car stopping means for electric cars and the like comprising a working circuit, a controller, a circuit breaker, and electrically operated means comprising a controlling circuit and a switch adapted when closed to operate the circuit breaker to break the working circuit when the controller is in running position and the car door is open, and automatic means for controlling an air brake operated by the circuit breaker, and operating means for putting it into operation when the working circuit is broken.

31. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit, when the car door is open, and automatic means for controlling an air brake operated by the circuit breaker, and operating means for putting it into operation when the working circuit is broken.

32. An automatic car stopping means for electric cars and the like comprising a working circuit, a controller, a circuit breaker, and electrically operated means for operating the circuit breaker to break the working circuit when the operator removes his hand from the controller handle when the controller is in running position, and automatic means for controlling an air brake operated by the circuit breaker, and operating means for putting it into operation when the working circuit is broken, and automatic means for discharging sand onto the rails during the time that the brake is in operation.

33. An automatic car stopping means for electric cars and the like comprising a working circuit, a controller, a circuit breaker, and electrically operated means for operating the circuit breaker to break the working circuit when the operator removes his hand from the controller handle when the controller is in running position, and auxiliary means controlled by the operator for neutralizing the circuit breaker operating means, and automatic means for controlling an air brake operated by the circuit breaker, and operating means for putting it into operation when the working circuit is broken, and automatic means for discharging sand onto the rails during the time that the brake is in operation.

34. An automatic car stopping means for electric cars and the like comprising a working circuit, a controller, a circuit breaker, and electrically operated means for operating the circuit breaker to break the working circuit when the operator removes his hand from the controller handle when the controller is in running position, and auxiliary means controlled by the operator for neutralizing the circuit breaker operating means, said means comprising a foot switch, pressure on which interrupts the circuit breaker operating means, and automatic means for controlling an air brake operated by the circuit breaker, and operating means for putting it into operation when the working circuit is broken, and automatic means for discharging sand onto the rails during the time that the brake is in operation.

35. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, and automatic means for controlling an air brake operated by the circuit breaker, and operating means for putting it into operation when the working circuit is broken, and automatic means for discharging sand onto the rails during the time that the brake is in operation.

36. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, and auxiliary means controlled by the operator for neutralizing the circuit breaker operating means, and automatic means for controlling an air brake operated by the circuit breaker, and operating means for putting it into operation when the working circuit is broken, and automatic means for discharging sand onto the rails during the time that the brake is in operation.

37. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, and auxiliary means controlled by the operator for neutralizing the circuit breaker operating means, said means comprising a foot switch, pressure on which interrupts the circuit breaker operating means, and automatic means for controlling an air brake operated by the circuit breaker, and operating means for putting it into operation when the working circuit is broken, and automatic means for discharging sand onto the rails during the time that the brake is in operation.

38. An automatic car stopping means for electric cars and the like comprising a working circuit, a controller, a circuit breaker, and electrically operated means for operating the circuit breaker to break the working circuit when the controller is in running position and the car door is open, and automatic means for controlling an air brake operated by the circuit breaker, and operating means for putting it into operation when the working circuit is broken, and automatic means for discharging sand onto the rails during the time that the brake is in operation.

39. An automatic car stopping means for electric cars and the like comprising a working circuit, a controller, a circuit breaker, and electrically operated means, operative only when the controller has been moved away from the neutral position, for operating the circuit breaker to break the working circuit, when the car door is open, and automatic means for controlling an air brake operated by the circuit breaker, and operating means for putting it into operation when the working circuit is broken and automatic means for discharging sand onto the rails during the time that the brake is in operation.

40. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, and automatic means for controlling an air brake operated by the circuit breaker, and operating means for putting it into operation when the working circuit is broken, and automatic means for discharging sand onto the rails during the time that the brake is in operation.

41. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, and auxiliary means controlled by the operator for neutralizing the circuit breaker operating means, and automatic means for controlling an air brake operated by the circuit breaker and operating means for putting it into operation when the working circuit is broken, and automatic means for discharging sand onto the rails during the time that the brake is in operation.

42. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, and auxiliary means controlled by the operator for neutralizing the circuit breaker operating means, said means comprising a foot switch, pressure on which interrupts the circuit breaker operating means, and automatic means for controlling an air brake operated by the circuit breaker, and operating means for putting it into operation when the working circuit is broken, and automatic means for discharging sand onto the rails during the time that the brake is in operation.

43. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, and automatic means for controlling an air brake operated by the circuit breaker, and operating means for putting it into operation when the working circuit is broken, and automatic means for discharging sand onto the rails during the time that the brake is in operation.

44. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, and auxiliary means controlled by the operator for neutralizing the circuit breaker operating means, and automatic means for controlling an air brake operated by the circuit breaker, and operating means for putting it into operation when the working circuit is broken, and automatic means for discharging sand onto the rails during the time that the brake is in operation.

45. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, and auxiliary means controlled by the operator for neutralizing the circuit breaker operating means, said means comprising a foot switch, pressure on which interrupts the circuit breaker operating means, and automatic means for controlling an air brake operated by the circuit breaker, and operating means for putting it into operation when the working circuit is broken, and automatic means for discharging sand onto the rails during the time that the brake is in operation.

46. An automatic car stopping means for electric cars and the like comprising a working circuit, a controller, a circuit breaker, and electrically operated means comprising a controlling circuit and a switch adapted when closed to operate the circuit breaker to break the working circuit when the controller is in running position and the car door is open, and automatic means for controlling an air brake operated by the circuit breaker, and operating means for putting it into operation when the working circuit is broken, and automatic means for discharging sand onto the rails during the time that the brake is in operation.

47. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit, when the car door is open, and automatic means for controlling an air brake operated by the circuit breaker, and operating means for putting it into operation when the working circuit is broken, and automatic means for discharging sand onto the rails during the time that the brake is in operation.

48. An automatic car stopping means for electric cars and the like comprising a working circuit, a controller, a circuit breaker, and electrically operated means for operating the circuit breaker to break the working circuit when the operator removes his hand from the controller handle when the controller is in running position, an emergency valve controlling air brake mechanism, a release valve controlling the emergency valve and adapted to be operated by the circuit breaker operating means.

49. An automatic car stopping means for electric cars and the like comprising a working circuit, a controller, a circuit breaker, and electrically operated means for operating the circuit breaker to break the working circuit when the operator removes his hand from the controller handle when the controller is in running position, and auxiliary means controlled by the operator for neutralizing the circuit breaker operating means, an emergency valve controlling air brake mechanism, a release valve controlling the emergency valve and adapted to be operated by the circuit breaker operating means.

50. An automatic car stopping means for electric cars and the like comprising a working circuit, a controller, a circuit breaker, and electrically operated means for operating the circuit breaker to break the working circuit when the operator removes his hand from the controller handle when the controller is in running position, and auxiliary means controlled by the operator for neutralizing the circuit breaker operating means, said means comprising a foot switch pressure on which interrupts the circuit breaker operating means, an emergency valve controlling air brake mechanism, a release valve controlling the emergency valve and adapted to be operated by the circuit breaker operating means.

51. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, an emergency valve controlling air brake mechanism, a release valve controlling the emergency valve and adapted to be operated by the circuit breaker operating means.

52. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, and auxiliary means controlled by the operator for neutralizing the circuit breaker operating means, an emergency valve controlling air brake mechanism, a release valve controlling the emergency valve and adapted to be operated by the circuit breaker operating means.

53. An automatic car stopping means for electric cars and the like comprising a working circuit, a controller, a circuit breaker, and electrically operated means, operative only when the controller has been moved away from the neutral position, for operating the circuit breaker to break the working circuit when the operator removes his hand from the controller handle, and auxiliary means controlled by the operator for neutralizing the circuit breaker operating means, said means comprising a foot switch, pressure on which interrupts the circuit breaker operating means, an emergency valve controlling air brake mechanism, a release valve controlling the emergency valve and adapted to be operated by the circuit breaker operating means.

54. An automatic car stopping means for electric cars and the like comprising a working circuit, a controller, a circuit breaker, and electrically operated means for operating the circuit breaker to break the working circuit when the controller is in running position and the car door is open, an emergency valve controlling air brake mechanism, a release valve controlling the emergency valve and adapted to be operated by the circuit breaker operating means.

55. An automatic car stopping means for electric cars and the like comprising a working circuit, a controller, a circuit breaker, and electrically operated means, operative only when the controller has been moved away from the neutral position, for operating the circuit breaker to break the working circuit, when the car door is open, an emergency valve controlling air brake mechanism, a release valve controlling the emergency valve and adapted to be operated by the circuit breaker operating means.

56. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, an emergency valve controlling air brake mechanism, a release valve controlling the emergency valve and adapted to be operated by the circuit breaker operating means.

57. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, and auxiliary means controlled by the operator for neutralizing the circuit breaker operating means, an emergency valve controlling air brake mechanism, a release valve controlling the emergency valve and adapted to be operated by the circuit breaker operating means.

58. An automatic car stopping means for electric cars and the like comprising a working circuit, a controller, a circuit breaker, and electrically operated means comprising a controlling circuit and a switch adapted when closed to operate the circuit breaker to break the working circuit when the operator removes his hand from the controller handle when the controller is in running position, and auxiliary means controlled by the operator for neutralizing the circuit breaker operating means, said means comprising a foot switch, pressure on which interrupts the circuit breaker operating means, an emergency valve controlling air brake mechanism, a release valve controlling the emergency valve and adapted to be operated by the circuit breaker operating means.

59. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, an emergency valve controlling air brake mechanism, a release valve controlling the emergency valve and adapted to be operated by the circuit breaker operating means.

60. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, and auxiliary means controlled by the operator for neutralizing the circuit breaker operating means, an emergency valve controlling air brake mechanism, a release valve controlling the emergency valve and adapted to be operated by the circuit breaker operating means.

61. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit when the operator removes his hand from the controller handle, and auxiliary means controlled by the operator for neutralizing the circuit breaker operating means, said means comprising a foot switch, pressure on which interrupts the circuit breaker operating means, an emergency valve controlling air brake mechanism, a release valve controlling the emergency valve and adapted to be operated by the circuit breaker operating means.

62. An automatic car stopping means for electric cars and the like comprising a working circuit, a controller, a circuit breaker, and electrically operated means comprising a controlling circuit and a switch adapted when closed to operate the circuit breaker to break the working circuit when the controller is in running position and the car door is open, an emergency valve controlling air brake mechanism, a release valve controlling the emergency valve and adapted to be operated by the circuit breaker operating means.

63. An automatic car stopping means for electric cars and the like comprising a working circuit, a controller, a circuit breaker, and electrically operated means comprising a controlling circuit and a switch adapted when closed, operative only when the controller has been moved away from the neutral position, to operate the circuit breaker to break the working circuit, when the car door is open, an emergency valve controlling an air brake mechanism, a release valve controlling the emergency valve and adapted to be operated by the circuit breaker operating means.

64. An automatic car stopping means for electric cars and the like comprising an emergency valve for a brake system, a controller handle, and electrically operated means for operating said emergency valve to put the brake into operation when the operator removes his hand from the controller handle when the controller is in running position, and auxiliary means controlled by the operator for neutralizing the valve operating means.

65. An automatic car stopping means for electric cars and the like comprising an emergency valve for a brake system, a controller handle, an electrically operated valve adapted to control the emergency valve, to put the brake into operation when the operator removes his hand from the controller handle when the controller is in running position, and auxiliary means controlled by the operator for neutralizing the valve operating means.

66. An automatic car stopping means for electric cars and the like comprising an emergency valve for a brake system, a controller handle, and electrically operated means for operating said emergency valve to put the brake into operation when the operator removes his hand from the controller handle when the controller is in running position, and auxiliary means controlled by the operator for neutralizing the valve operating means, comprising a foot operating switch.

67. An automatic car stopping means for electric cars and the like comprising an emergency valve for a brake system, a controller handle, an electrically operated valve adapted to control the emergency valve, to put the brake into operation when the operator removes his hand from the controller handle when the controller is in running position, and auxiliary means controlled by the operator for neutralizing the valve operating means, comprising a foot operating switch.

68. An automatic car stopping means for electric cars and the like comprising an emergency valve for a brake system, a controller handle, and electrically operated means for operating said emergency valve to put the brake into operation when the controller is in running position and the car door is open.

69. An automatic car stopping means for electric cars and the like comprising an emergency valve for a brake system, a controller handle, an electrically operated valve adapted to control the emergency valve, to put the brake into operation when the controller is in running position and the car door is open.

70. An automatic car stopping means for electric cars and the like comprising an emergency valve for a brake system, a controller handle, and electrically operated means for operating said emergency valve to put the brake into operation when the operator removes his hand from the controller handle, said valve operating means operative only when the controller has been moved away from a neutral position.

71. An automatic car stopping means for electric cars and the like comprising an emergency valve for a brake system, a controller handle, an electrically operated valve adapted to control the emergency valve, to put the brake into operation when the operator removes his hand from the controller handle, said valve operating means operative only when the controller has been moved away from a neutral position.

72. An automatic car stopping means for electric cars and the like comprising an emergency valve for a brake system, a controller handle, and electrically operated means for operating said emergency valve to put the brake into operation when the operator removes his hand from the controller handle, and auxiliary means controlled by the operator for neutralizing the valve operating means, said valve operating means operative only when the controller has been moved away from a neutral position.

73. An automatic car stopping means for electric cars and the like comprising an emergency valve for a brake system, a controller handle, an electrically operated valve adapted to control the emergency valve, to put the brake into operation when the operator removes his hand from the controller handle, and auxiliary means controlled by the operator for neutralizing the valve operating means, said valve operating means operative only when the controller has been moved away from a neutral position.

74. An automatic car stopping means for electric cars and the like comprising an emergency valve for a brake system, a controller handle, and electrically operated means for operating said emergency valve to put the brake into operation when the operator removes his hand from the controller handle, and auxiliary means controlled by the operator for neutralizing the valve operating means, comprising a foot operating switch, said valve operating means operative only when the controller has been moved away from a neutral position.

75. An automatic car stopping means for electric cars and the like comprising an emergency valve for a brake system, a controller handle, an electrically operated valve adapted to control the emergency valve, to put the brake into operation when the operator removes his hand from the controller handle, and auxiliary means controlled by the operator for neutralizing the valve operating means, comprising a foot operating switch, said valve operating means operative only when the controller has been moved away from a neutral position.

76. An automatic car stopping means for electric cars and the like comprising an emergency valve for a brake system, a controller handle, and electrically operated means for operating said emergency valve to put the brake into operation when the car door is open, said valve operating means operative only when the controller has been moved away from a neutral position.

77. An automatic car stopping means for electric cars and the like comprising an emergency valve for a brake system, a controller handle, an electrically operated valve adapted to control the emergency valve, to put the brake into operation when the car door is open, said valve operating means operative only when the controller has been moved away from a neutral position.

78. An automatic car stopping means for electric cars and the like comprising an emergency valve for a brake system, a controller handle, and electrically operated means for operating said emergency valve to put the brake into operation when the operator removes his hand from the controller handle when the controller is in running position, said valve operating means comprising a controlled circuit and a switch adapted to close it to energize the circuit.

79. An automatic car stopping means for electric cars and the like comprising an emergency valve for a brake system, a controller handle, an electrically operated valve adapted to control the emergency valve, to put the brake into operation when the operator removes his hand from the controller handle when the controller is in running position, said valve operating means comprising a controlled circuit and a switch adapted to close it to energize the circuit.

80. An automatic car stopping means for electric cars and the like comprising an emergency valve for a brake system, a controller handle, and electrically operated means for operating said emergency valve to put the brake into operation when the operator removes his hand from the controller handle when the controller is in running position, and auxiliary means controlled by the operator for neutralizing the valve operating means, said valve operating means comprising a controlled circuit and a switch adapted to close it to energize the circuit.

81. An automatic car stopping means for electric cars and the like comprising an emergency valve for a brake system, a controller handle, an electrically operated valve adapted to control the emergency valve, to put the brake into operation when the operator removes his hand from the controller handle when the controller is in running position, and auxiliary means controlled by the operator for neutralizing the valve operating means, said valve operating means comprising a controlled circuit and a switch adapted to close it to energize the circuit.

82. An automatic car stopping means for electric cars and the like comprising an emergency valve for a brake system, a controller handle, and electrically operated means for operating said emergency valve to put the brake into operation when the operator removes his hand from the controller handle when the controller is in running position, and auxiliary means controlled by the operator for neutralizing the valve operating means, comprising a foot operating switch, said valve operating means comprising a controlled circuit and a switch adapted to close it to energize the circuit.

83. An automatic car stopping means for electric cars and the like comprising an emergency valve for a brake system, a controller handle, an electrically operated valve adapted to control the emergency valve, to put the brake into operation when the operator removes his hand from the controller handle, and auxiliary means controlled by the operator for neutralizing the valve operating means, comprising a foot operating switch, said valve operating means comprising a controlled circuit and a switch adapted to close it to energize the circuit.

84. An automatic car stopping means for electric cars and the like comprising an emergency valve for a brake system, a controller handle, and electrically operated means for operating said emergency valve to put the brake into operation when the controller is in running position and the car door is open, said valve operating means comprising a controlled circuit and a switch adapted to close it to energize the circuit.

85. An automatic car stopping means for electric cars and the like comprising an emergency valve for a brake system, a controller handle, an electrically operated valve adapted to control the emergency valve, to put the brake into operation when the controller is in running position and the car door is open, said valve operating means comprising a controlled circuit and a switch adapted to close it to energize the circuit.

86. An automatic car stopping means for electric cars and the like comprising an emergency valve for a brake system, a controller handle, and electrically operated means for operating said emergency valve to put the brake into operation when the operator removes his hand from the controller handle, said valve operating means operative only when the controller has been moved away from a neutral position, said valve operating means comprising a controlled circuit and a switch adapted to close it to energize the circuit.

87. An automatic car stopping means for electric cars and the like comprising an emergency valve for a brake system, a controller handle, an electrically operated valve adapted to control the emergency valve, to put the brake into operation when the operator removes his hand from the controller handle, said valve operating means operative only when the controller has been moved away from a neutral position, said valve operating means comprising a controlled circuit and a switch adapted to close it to energize the circuit.

88. An automatic car stopping means for electric cars and the like comprising an emergency valve for a brake system, a controller handle, and electrically operated means for operating said emergency valve to put the brake into operation when the operator removes his hand from the controller handle, and auxiliary means controlled by the operator for neutralizing the valve operating means, said valve operating means operative only when the controller has been moved away from a neutral position, said valve operating means comprising a controlled circuit and a switch adapted to close it to energize the circuit.

89. An automatic car stopping means for electric cars and the like comprising an emergency valve for a brake system, a controller handle, an electrically operated valve adapted to control the emergency valve, to put the brake into operation when the operator removes his hand from the controller handle, and auxiliary means controlled by the operator for neutralizing the valve operating means, said valve operating means operative only when the controller has been moved away from a neutral position, said valve operating means comprising a controlled circuit and a switch adapted to close it to energize the circuit.

90. An automatic car stopping means for electric cars and the like comprising an emergency valve for a brake system, a controller handle, and electrically operated means for operating said emergency valve to put the brake into operation when the operator removes his hand from the controller handle, and auxiliary means controlled by the operator for neutralizing the valve operating means, comprising a foot operating switch, said valve operating means operative only when the controller has been moved away from a neutral position, said valve operating means comprising a controlled circuit and a switch adapted to close it to energize the circuit.

91. An automatic car stopping means, for electric cars and the like comprising an emergency valve, a brake controlled thereby, a controller handle, an electrically operated valve adapted to control the emergency valve, to put the brake into operation when the operator removes his hand from the controller handle, and auxiliary means controlled by the operator for neutralizing the valve operating means, comprising a foot operating switch, said valve operating means operative only when the controller has been moved away from a neutral position, said valve operating means comprising a controlled circuit and a switch adapted to close it to energize the circuit.

92. An automatic car stopping means for electric cars and the like comprising an emergency valve for a brake system, a controller handle, and electrically operated means for operating said emergency valve to put the brake into operation when the car door is open, said valve operating means operative only when the controller has been moved away from a neutral position, said valve operating means comprising a controlled circuit and a switch adapted to close it to energize the circuit.

93. An automatic car stopping means for electric cars and the like comprising an emergency valve for a brake system, a controller handle, an electrically operated valve adapted to control the emergency valve, to put the brake into operation when the car door is open, said valve operating means operative only when the controller has been moved away from a neutral position, said valve operating means comprising a controlled circuit and a switch adapted to close it to energize the circuit.

In testimony whereof, I affix my signature in the presence of two witnesses this 25th day of August, 1919.

JOHN SUTHERLAND.

Witnesses:
 GEO. W. SCOTT, Jr.,
 C. R. FRAZIER.